United States Patent [19]
Barth et al.

[11] Patent Number: 6,076,862
[45] Date of Patent: Jun. 20, 2000

[54] CONCENTRIC SNAP-TOGETHER DIRECT VENT STRUCTURE AND ASSOCIATED FABRICATION METHODS

[75] Inventors: James T. Barth, Plano, Tex.; Gerry J. Smith, Nampa, Id.

[73] Assignee: Selkirk, Inc., Dallas, Tex.

[21] Appl. No.: 09/138,867

[22] Filed: Aug. 24, 1998

[51] Int. Cl.$^7$ .............................. E04H 17/02; F16L 39/00
[52] U.S. Cl. ................................ 285/123.1; 285/123.16; 285/123.15; 454/47; 138/148; 98/60
[58] Field of Search ........................... 285/123.1, 123.15, 285/123.16; 454/44, 47; 138/148, 149; 98/60

[56] References Cited

U.S. PATENT DOCUMENTS

| | | |
|---|---|---|
| 1,085,303 | 1/1914 | Scherer . |
| 1,429,822 | 9/1922 | Acer . |
| 2,076,210 | 4/1937 | Stadfeld . |
| 2,275,902 | 3/1942 | Hasenburger et al. ................ 72/93 |
| 2,305,397 | 12/1942 | Watter ................................ 189/34 |
| 2,401,974 | 6/1946 | Siebels ............................... 138/76 |
| 2,423,986 | 7/1947 | Lathrope ............................ 138/148 |
| 2,512,116 | 6/1950 | Siebels ............................... 138/87 |
| 2,679,867 | 6/1954 | Epstein ............................... 138/63 |
| 2,714,395 | 8/1955 | Epstein ............................... 138/87 |
| 2,775,238 | 12/1956 | Clark et al. ........................ 126/116 |
| 2,894,537 | 7/1959 | Carr .................................... 138/63 |
| 2,910,308 | 10/1959 | Carr .................................... 285/27 |
| 2,978,261 | 4/1961 | Epstein ............................... 285/133 |
| 3,087,408 | 4/1963 | Carr .................................... 98/46 |
| 3,110,324 | 11/1963 | De Haan ............................ 138/148 |
| 3,226,135 | 12/1965 | Epstein ............................... 285/41 |
| 3,428,040 | 2/1969 | Baker et al. ...................... 126/110 |
| 3,749,132 | 7/1973 | Prezewalski ....................... 138/113 |
| 3,842,721 | 10/1974 | Cardiff ............................... 98/60 |
| 3,872,780 | 3/1975 | Zanias ................................. 98/60 |
| 4,054,158 | 10/1977 | Hoeman et al. ................... 138/155 |
| 4,294,474 | 10/1981 | Harm ................................. 285/133 R |
| 4,522,191 | 6/1985 | Knowles et al. ................... 98/60 |
| 4,607,665 | 8/1986 | Williams ........................... 138/148 |
| 4,666,189 | 5/1987 | Taylor et al. ...................... 285/133.1 |
| 4,865,013 | 9/1989 | Teakell .............................. 126/307 R |
| 4,929,000 | 5/1990 | Annestedt ......................... 285/133.1 |
| 5,012,793 | 5/1991 | Guzorek ............................ 126/85 B |

*Primary Examiner*—Eric K. Nicholson
*Attorney, Agent, or Firm*—Konneker & Smith, P.C.

[57] ABSTRACT

Each longitudinal section of a concentric direct vent duct structure for a fuel-fired appliance, such as a furnace, is formed using a tubular outer duct having an axially spaced pair of triangular stand-off frame members anchored therein, and a smaller diameter inner duct having an axially spaced pair of ramped external annular locking projections thereon. To assemble the concentric duct section, the inner duct is simply axially inserted into the outer duct. As the inner duct is inserted into the outer duct, a ramped annular side surface on the leading inner duct locking projection resiliently and radially outwardly deflects side wall portions of the stand-off frame members and then permits them to snap back to their original undeflected positions. When the inner duct reaches its operative position within the outer duct, facing radially extending side surfaces on the locking projections straddle the stand-off frame members and act as abutments therewith to prevent removal of the inserted inner duct from the outer duct in either axial direction. The cooperation between the inner duct locking projections and the resiliently deflectable side wall portions of the stand-off frame members thus provides for a convenient snap-locking installation of the inner duct within the outer duct.

23 Claims, 3 Drawing Sheets

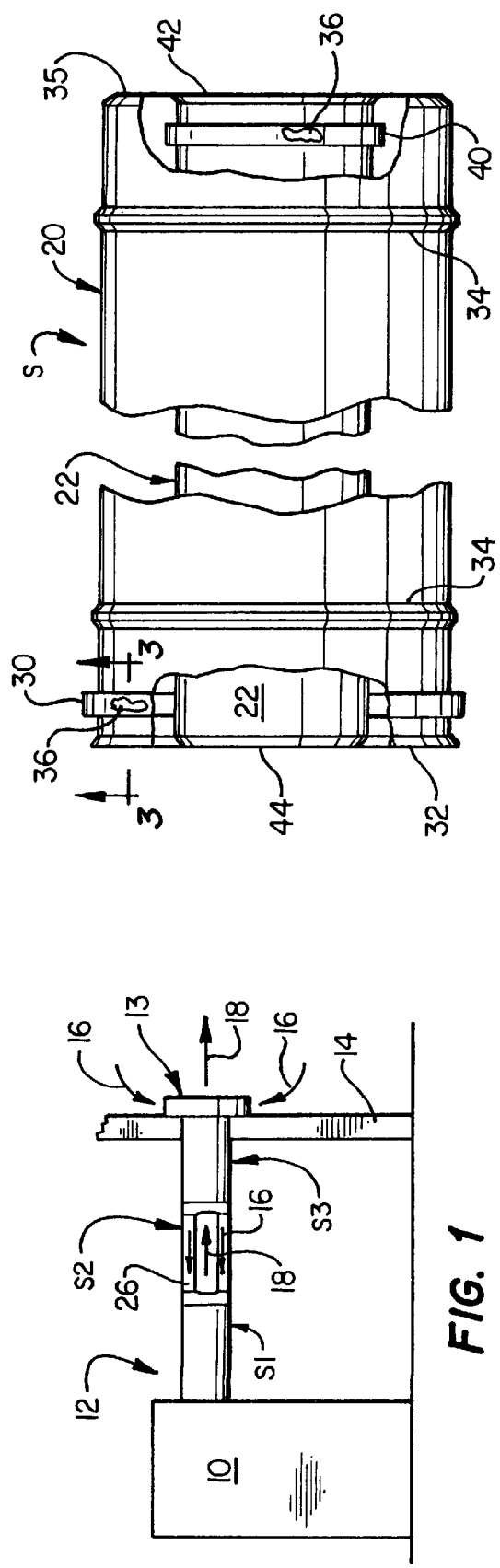
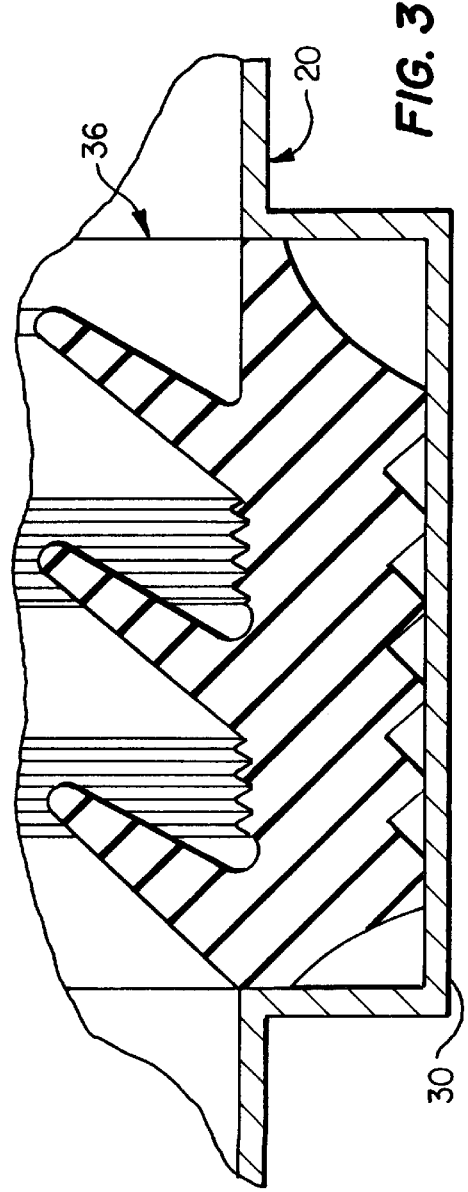

CONCENTRIC SNAP-TOGETHER DIRECT VENT STRUCTURE AND ASSOCIATED FABRICATION METHODS

BACKGROUND OF THE INVENTION

The present invention generally relates to vent apparatus for fuel-fired direct vent heating appliances and, in a preferred embodiment thereof, more particularly relates to a specially designed snap-together concentric direct vent structure section for such appliances, and methods fabricating the vent structure section.

Gas fired heating appliances, such as furnaces, located in interior paces of buildings require during their firing a continuous supply of combustion air. At the same time, such appliances generate hot combustion gases which must be appropriately discharged therefrom to the exterior of the building. One technique for supplying combustion air to a fuel-fired heating appliance, while at the same time creating a path through which its generated combustion gases may be discharged to the exterior of the building, is to operatively connect a concentric direct vent structure to the appliance.

As conventionally constructed, a direct vent structure of this general type is defined by lengths of concentric inner and outer ducts extended between the furnace and a combination intake/discharge assembly mounted on the outer side of an exterior wall of the building. The concentric inner and outer ducts define therebetween an annular space, with combustion gases from the furnace being discharged through the interior of the inner duct and out the intake/discharge assembly, while outside combustion air is drawn inwardly through the intake/discharge assembly and through the inner duct/outer duct annulus to the furnace.

To maintain the inner and outer ducts in a concentric alignment, stand-off structures are secured within the outer duct, extend through the inner duct/outer duct annulus, and provide lateral centering support for the inner duct. The overall concentric direct vent structure is typically made up from axial sections of concentric inner duct/outer duct assemblies which are appropriately connected in end-to-end relationships to form the desired length of the finished direct vent structure. From a materials standpoint, each of these sections conventionally includes an aluminum inner duct, a galvanized steel outer duct, and one or more non-galvanized steel stand-off members secured within the outer duct and supporting the inner duct therein.

Various well-known problems, limitations and disadvantages have heretofore been associated with the conventional manufacture and assembly of the individual longitudinal sections of this general type of concentric direct vent structure. For example, the installation of the stand-off structures within the outer duct tends to be difficult and relatively expensive. Additionally, the connection of the stand-off structures to the inner duct also tends to be difficult and relatively expensive. Typically, this connection of the stand-off structures to the inner duct undesirably required penetration of the inner duct (for example, with rivets), and thus resulting gas leaks in the inner duct, since spot welding techniques could not be used to join the aluminum inner duct to the steel stand-off structures. Moreover, the proper insertion and positioning of the inner duct section within its associated outer duct section tends to be a tedious and time-consuming task, which undesirably adds to the overall fabrication cost of conventionally constructed concentric direct vent assemblies of this general type.

From the foregoing it can be seen that a need exists for improvements in the manner in which a longitudinal section of a concentric duct direct vent structure is constructed. It is to this need that the present invention is directed.

SUMMARY OF THE INVENTION

In carrying out principles of the present invention, in accordance with a preferred embodiment thereof, each longitudinal section of a concentric direct vent duct structure for a fuel-fired appliance, such as a furnace, is provided with a specially designed snap-together construction which simplifies and reduces the expense of the construction of the overall direct vent structure.

From a broad perspective, each longitudinal section of the direct vent structure comprises an outer duct extending along a first axis, specially designed stand-off apparatus anchored within the outer duct and preferably including first and second axially spaced first and second standoff members anchored within the outer duct and circumscribing the first axis; an inner duct extending along a second axis and being laterally smaller than the outer duct; and first and second axially spaced exterior projections disposed on and extending laterally around the inner duct.

To assemble the concentric duct section, the inner duct is simply inserted into the outer duct to a predetermined operative position therein. The stand-off members in the outer duct and the exterior projections on the inner duct are configured to be cooperable, in response to axial insertion of the inner duct into the outer duct to the predetermined operative inner duct position therein, to provide a snap-fitted relationship between the inner and outer ducts, in which the centered inner duct is locked against removal in either axial direction from the outer duct, when the inner duct reaches its predetermined operative position within the outer duct.

Preferably, each of the inner and outer ducts has a circular cross-section, and each of the stand-off members has a frame-like polygonal configuration, representatively triangular, and has plate-shaped side wall portions which are resiliently deflectable in radially outward directions and have opposite, axially facing side edge portions. The locking portions on the inner duct are preferably annular external ribs having axially inwardly facing, radially extending first side surfaces, and annular second side surfaces that are ramped in axially inward and radially outward directions.

As the inner duct is inserted into the outer duct, the ramped annular side surface on the leading inner duct projection resiliently and radially outwardly deflects side wall portions of the stand-off frame members and then permits them to snap back to their original undeflected positions. When the inner duct reaches its operative position within the outer duct, the facing radially extending side surfaces on the inner duct projections straddle the stand-off frame members and act as abutments therefor to prevent removal of the inserted inner duct from the outer duct in either axial direction. The cooperation between the inner duct locking projections and the resiliently deflectable side wall portions of the stand-off frame members thus provides for a convenient snap-locking installation of the inner duct within the outer duct.

To facilitate the end-to-end connection of a series of the assembled longitudinal concentric duct sections to form the overall concentric direct vent structure, end portions of the inner and outer ducts in each assembled longitudinal concentric duct sections are provided with annular interior resilient seal members carried in annular exterior seal pocket areas and radially projecting into the duct. In this manner, a series of assembled concentric duct sections may be simply telescoped in end-to-end relationships to sealingly join the facing ends of each opposing pair of inner ducts and outer ducts and thereby form the overall concentric direct vent duct structure.

While the overall stand-off apparatus anchored within the outer duct is preferably defined by axially spaced first and second individual stand-off members, the stand-off apparatus, particularly in the case of relatively short concentric duct sections, could alternatively be defined by a single stand-off member. In this case, axially spaced first and second portions of the single stand-off member would perform the same inner duct locking function as the separate axially spaced stand-off members.

BRIEF DESCRIPTION OF THE DRAWINGS

FIG. 1 is a partially cut-away schematic side elevational view of a representative fuel-fired heating appliance to which is operatively connected a specially designed concentric snap-together direct vent structure embodying principles of the present invention;

FIG. 2 is an enlarged scale, axially foreshortened, partially cut-away side elevational view of an assembled longitudinal section of the concentric vent structure illustrating pocketed seal structures carried on its inner and outer ducts;

FIG. 3 is an enlarged scale cross-sectional detail view through the outer duct seal structure taken along line 3—3 of FIG. 2;

DETAILED DESCRIPTION

Figure 4:
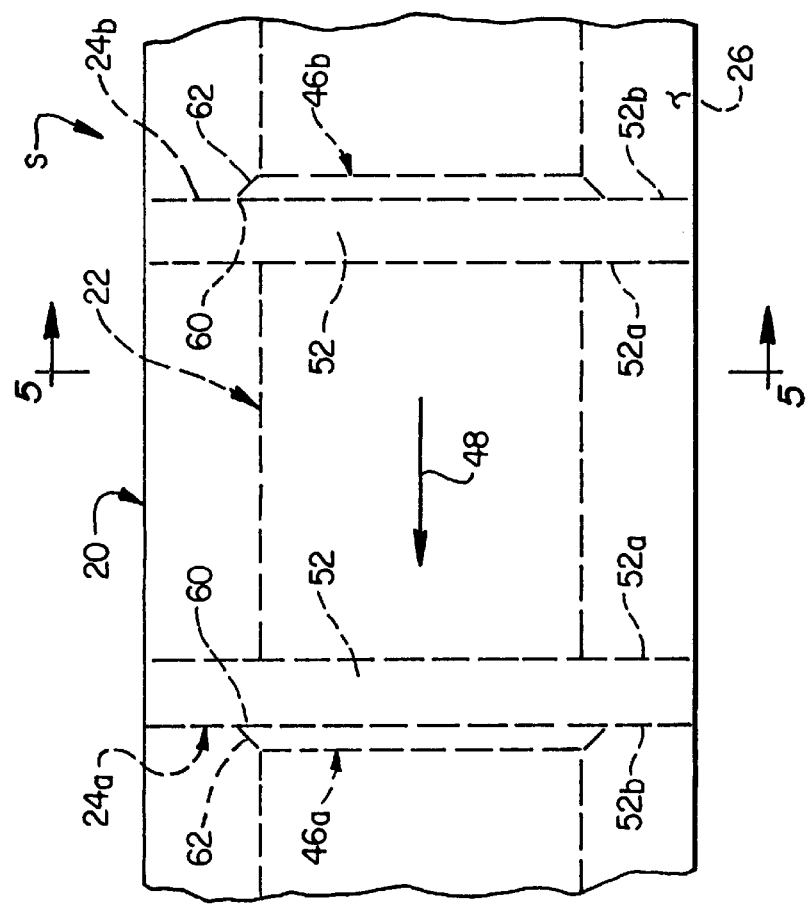
FIG. 4 is an enlarged scale, axially foreshortened schematic side elevational view of the longitudinal vent section shown in FIG. 2 and illustrating in phantom the specially designed snap-together construction of its concentric inner and outer ducts.

Schematically shown in FIG. 1 is a fuel-fired heating appliance, such as a gas-fired furnace 10, to which a specially designed concentric direct vent structure 12 is attached. Direct vent structure 12 is connected between the furnace 10 and a conventional combination intake/exhaust assembly 13 on an outside wall 14, and is used to flow outside combustion air 16 into the furnace 10, while at the same time exhausting combustion gases 18 from the furnace 10.

Referring now to FIGS. 1–5, the concentric direct vent structure 12 is representatively formed from three joined-together tubular sections S1–S3, each having a tubular outer galvanized steel combustion air intake duct 20, and a smaller diameter tubular inner aluminum combustion discharge duct 22 held concentrically in place within the outer duct 20 by means of a unique stand-off apparatus, representatively in the form of an axially spaced pair of specially designed stand-off members 24a,24b anchored within the outer duct 20 and cooperating with structures on the inner duct 22 to provide a unique snap-together construction for each of the sections S1–S3 as later described herein. In each assembled concentric inner/outer duct section S, the inner duct 22 is axially locked within its associated outer duct 20 by the axially spaced stand-off members 24a,24b as later described herein.

Figure 5:
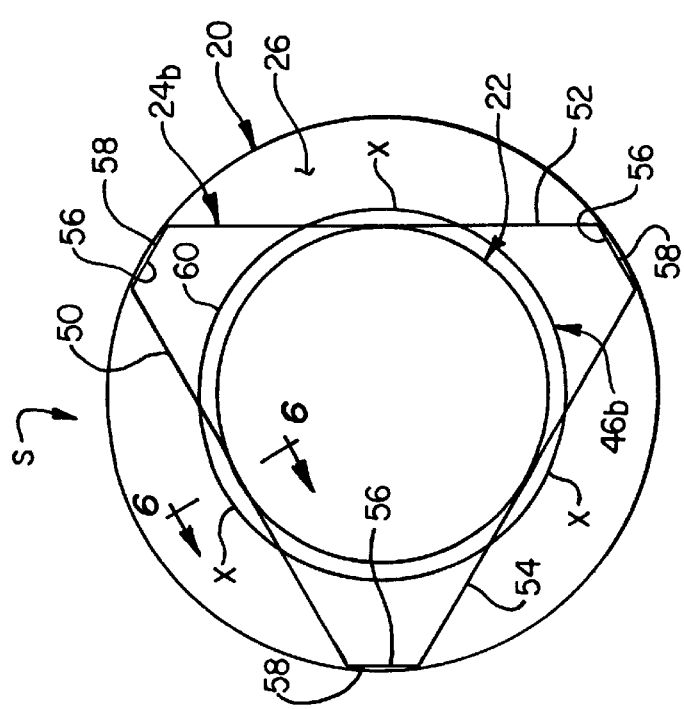
FIG. 5 is a schematic cross-sectional view through the longitudinal vent section taken along line 5—5 of FIG. 4.

As can be seen in FIG. 5, the ducts 20,22 in each section S form therebetween an annular space 26. During operation of the furnace 10, outside combustion air 16 is drawn into the furnace 10 through the annular spaces 26, while hot combustion gases 18 discharged from the furnace flow outwardly through the interiors of the inner ducts 20.

In each section S, the outer duct 20 has a continuous butt weld seam 28 along its length (see FIG. 7), an outwardly projecting annular seal pocket 30 adjacent one of its ends 32 (see FIGS. 2 and 7), and a longitudinally spaced pair of annular external stiffening portions 34 positioned between the seal pocket 30 and the opposite end 35 of the outer duct 20. Each seal pocket 30 has interiorly disposed therein an annular elastomeric sealing member 36 (see FIG. 3) having the indicated webbed and ridged cross-sectional configuration, the sealing member being of a conventional type for this application and being commercially available from Selkirk, Inc., 14801 Quorum Drive, Dallas, Tex. 75240-7584.

The inner duct 22 in each section S has a continuous butt-weld seam 38 along its length, an outwardly projecting annular seal pocket 40 adjacent one of its ends 42, and an opposite end 44. Additionally, the inner duct 22 in each section S has an axially spaced pair of specially configured ramped annular stiffening portions 46a,46b (see FIGS. 4–6). In addition to stiffening the inner duct 22, these annular external portions 46a,46b also function, as later described herein, to provide a unique snap-fit connection of the inner duct 22 within its associated outer duct 20. Representatively, in each section S the end 42 of the inner duct 22 is adjacent the end 35 of the outer duct 20. Seal pocket 40 receives an annular, inwardly projecting elastomeric seal 36 (see FIG. 2) similar to the seal 36 received in the seal pocket 30 of the outer duct 20 and illustrated in FIG. 3.

Figure 7:
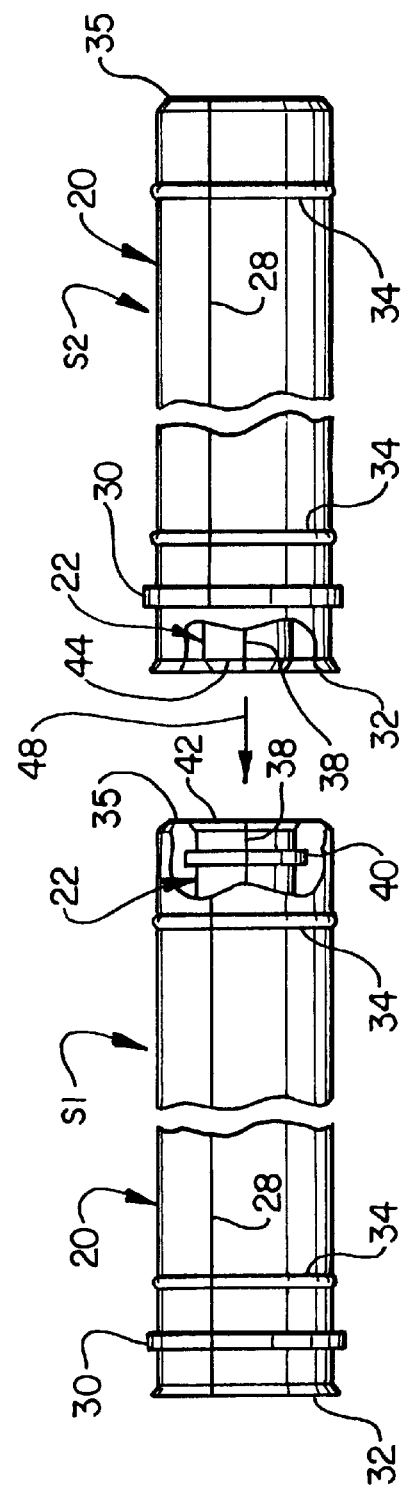
FIG. 7 is an exploded, partially cut-away side elevational view of two of the assembled concentric duct direct vent sections illustrating how they are sealingly joined in the end-to-end relationship schematically depicted in FIG. 1.

As schematically illustrated in FIG. 7, adjacent sections S (for example, the illustrated sections S1 and S2) may be very rapidly joined by simply telescoping the two sections, as indicated by the arrow 48 in FIG. 7, to (1) cause the end 35 of the outer duct 20 in section S1 to enter the end 32 of the outer duct 20 in section S2 and be sealingly engaged by the annular seal 36 within the seal pocket 30 of the outer duct 20 of section S2, and (2) cause the end 44 of the inner duct 22 of section S2 to enter the end 42 of the inner duct 22 of section S1 and be sealingly engaged by the annular seal 36 within the seal pocket 40 of the inner duct 22 of section S1.

According to a key aspect of the present invention, the specially configured, axially spaced pairs of stand-off frame members 24a,24b and annular exterior stiffening portions 46a,46b on each inner duct 22 permit a unique snap-together assembly of each associated outer and inner duct pair 20,22 which will now be described with reference to FIGS. 4–6.

Each of the two axially spaced apart stand-off members 24a,24b is representatively formed from a rectangular strip of non-galvanized steel, and is bent to a generally triangular shape having three plate-shaped side walls 50,52,54 with truncated apex portions 56 positioned between the side walls. Each apex portion 56 is anchored to the inner side of the outer is duct 20, as by spot welds 58. The side walls 50,52,54 have, relative to the outer duct 20, axially inwardly facing side edges 50a,52a,54a and axially outwardly facing side edges 50b,52b,54b.

Figure 6:
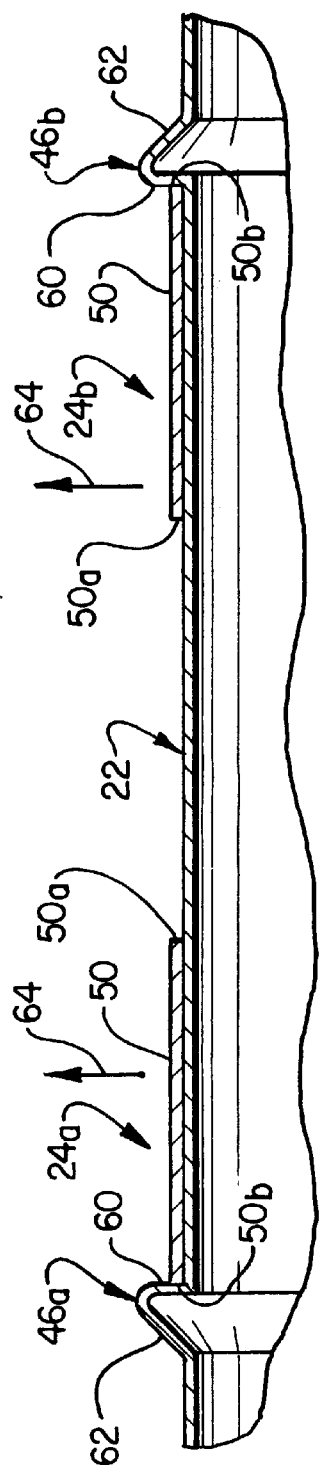
FIG. 6 is an enlarged scale cross-sectional detail view through the longitudinal vent section taken along line 6—6 of FIG. 5.

As may be best seen in FIG. 6, each of the annular external ribs 46a,46b on the inner duct 22 has a generally radially extending, axially inwardly facing annular side surface 60, and an opposite annular ramped annular side surface 62 which is sloped axially inwardly and radially outwardly. To assemble the illustrated representative longitudinal section of the concentric direct vent structure 12 shown in FIG. 4, the inner duct 22 is representatively inserted leftwardly into the outer duct 20 as indicated by the arrow 48 in FIGS. 4 and 7. AS the left annular ramped rib 46a on the inner duct 22 sequentially passes through the right and left stand-off members 24b and 24a, the ramped annular side surface 62 of the rib 46a resiliently cams the side walls 50,52,54 of the stand-off members 24b,24a radially outwardly, as indicated by the arrows 64 in FIG. 6, to permit passage of the rib 46a sequentially through the stand-off members 46b,46a.

After the rib 46a passes through the stand-off members 46b,46a the outwardly deflected side wall portions 50,52,54 of each stand-off member snap back to their original undeflected positions shown in FIG. 5. Just as the rib 46a leftwardly passes through the left stand-off member 24a, the right, unramped annular side surface 60 of the rib 46a is leftwardly adjacent the left side edges 50b,52b,54b of the side walls 50,52,54 of the left stand-off member 24a, and the left, unramped annular side surface 60 of the right rib 46b is rightwardly adjacent the right side edges 50b,52b,54b of the side walls 50,52,54 of the right stand-off member 24b.

Thus, the cooperation between the axially spaced apart ribs 46a,46b on the inner duct 22 and the axially spaced apart stand-off members 24a,24b anchored to the outer duct 20 permit the inner duct 22 to simply be axially snapped into place within the outer duct 20. While the installation was illustrated and described with the inner duct 22 being leftwardly inserted into the outer duct 20 (see FIG. 4), the oppositely sloped annular side surfaces 62 on the inner duct ribs 46a,46b permit the operative axial snap-fit insertion of the inner duct 22 in either axial direction into the outer duct 20.

With the inner duct 22 in its snapped-into-place installed FIG. 4 orientation within the outer duct 20, circumferential portions X of the unramped, axially inwardly facing annular side edges 60 (see FIG. 5) radially outwardly overlap the facing side edges of the stand-off member side walls 50,52, 54 (see FIG. 4 also) in a manner locking the inserted inner duct 22 within the outer duct 20 against removal in either axial direction therefrom. The stand-off members 24a,24b thus laterally position the inner duct 22 in a concentric relationship with the outer duct 20 and axially lock it in place therein by means of the cooperation between the radially resilient stand-off members 24a,24b and the inner duct ribs 46a,46b.

While the side walls 50,52,54 of the stand-off members 24a,24b are radially resilient, they are quite stiff in the axial direction, thereby firmly preventing appreciable relative axial movement between the outer and inner duct portions 20,22 of each section S of the overall direct vent structure 12. Thus, when the sections S are joined end-to-end as previously discussed in conjunction with FIG. 7, the inner duct 22 is firmly braced in opposite axial directions within the outer duct 20. The stand-off mebers 24a,24b have been representatively illustrated as having generally triangular configurations. However, they alternatively could have other polygonal configurations if desired.

As can be seen from the foregoing, the present invention provides a uniquely simple and rapid snap-together construction for an axial section of a concentric direct vent structure which, in turn, simplifies and reduces the cost of constructing the overall concentric direct vent structure compared to conventional fabrication techniques. In addition to these advantages, this construction technique eliminates completely the necessity of penetrating the inner duct to operatively associate it with the stand-off members carried within the outer duct. In fact, no fasteners of any kind are required to operatively associate the inner duct with the stand-off members—once the inner duct is axially snapped into place within the outer duct, this operative association between the inner duct and the stand-of members within the outer duct is automatically achieved.

While the overall stand-off apparatus anchored within the outer duct 20 is preferably defined by axially spaced first and second individual stand-off members 24a and 24b, it will be appreciated by those of skill in this particular art that such stand-off apparatus, particularly in the case of s shorter concentric duct sections, could alternatively be defined by a single stand-off member. In this case, axially spaced first and second portions of the single stand-off member would perform the same inner duct locking function as the separate axially spaced stand-off members 24a,24b representatively illustrated and described herein.

The foregoing detailed description is to be clearly understood as being given by way of illustration and example, the spirit and scope of the present invention being limited solely by the appended claims.

What is claimed is:

1. Concentric duct apparatus, comprising:
    an outer duct extending along a first axis;
    stand-off apparatus anchored within said outer duct and circumscribing said first axis;
    an inner duct extending along a second axis and being laterally smaller than said outer duct; and
    first and second axially spaced exterior projections disposed on and extending laterally around said inner duct,
    said inner duct being coaxially insertable into said outer duct to a predetermined operative position therein,
    said stand-off apparatus and said exterior projections being cooperable, in response to coaxial insertion of said inner duct into said outer duct, to provide a snap-fitted relationship between said inner and outer ducts, in which said inner duct is nonreleasably locked against removal in either axial direction from said outer duct, when said inner duct reaches said operative position thereof.

2. The concentric duct apparatus of claim 1 wherein said inner duct is operatively positioned within said outer duct.

3. The concentric duct apparatus of claim 1 wherein each of said inner and outer ducts, on an end portion thereof, carries a resilient seal member circumscribing its axis.

4. The concentric duct apparatus of claim 3 wherein each of said inner and outer ducts, on said end portion thereof, has a laterally outwardly projecting seal pocket structure within which its resilient seal member is operatively carried.

5. The concentric duct apparatus of claim 1 wherein said stand-off apparatus includes first and second axially spaced stand-off members.

6. The concentric duct apparatus of claim 5 wherein each of said first and second stand-off members extends around said first axis and has a frame-like, generally polygonal configuration.

7. The concentric duct apparatus of claim 6 wherein each of said first and second stand-off members has a frame-like, generally triangular configuration.

8. The concentric duct apparatus of claim 6 wherein each of said first and second stand-off members has generally flat plate-shaped side wall portions which are resiliently deflectable in directions transverse to said first axis, have axially facing opposite side edge portions, and are substantially undeflectable in opposite directions parallel to said first axis.

9. The concentric duct apparatus of claim 1 wherein said first and second exterior projections have annular configurations.

10. The concentric duct apparatus of claim 1 wherein each of said first and second exterior projections has an axially inwardly facing first side surface transverse to said second axis, and an axially outwardly facing surface which is axially inwardly and laterally outwardly sloped.

11. The concentric duct apparatus of claim 1 wherein each of said inner and outer ducts has a circular cross-section.

12. Concentric duct apparatus, comprising:

a tubular outer duct extending along an axis;

a tubular inner duct coaxially disposed within said outer duct and defining therewith an annular flow area therebetween;

axially spaced first and second stand-off frame members anchored within said outer duct and supporting said inner duct in said coaxial relationship therewith, each of said first and second stand-off frame members having a generally polygonal shape with generally flat, plate-shaped side wall portions resiliently deflectable transversely to said axis, having axially facing opposite side edge portions, and being substantially undeflectable in opposite directions parallel to said axis, and axially spaced first and second annular exterior projections formed on said inner duct and axially straddling said first and second stand-off frame members, each of said first and second annular exterior projections having an axially inwardly facing flat annular side surface lying in a plane transverse to said axis, with circumferential portions of said side surfaces radially overlapping facing side edge portions of the side wall portions of one of said first and second stand-off frame members, and an axially outwardly facing annular side surface which is axially inwardly and radially outwardly sloped, said circumferential portions of said axially inwardly facing annular side surfaces of said first and second annular exterior projections forming locking abutments preventing axially inward movement of each exterior projection past its facing stand-off frame member.

13. The concentric duct apparatus of claim 12 wherein each of said first and second stand-off frame members has a generally triangular configuration.

14. The concentric duct apparatus of claim 12 wherein:

said outer duct is of a galvanized steel construction, said inner duct is of an aluminum construction, and said first and second stand-off frame members are of a non-galvanized steel construction.

15. The concentric duct apparatus of claim 14 wherein said first and second stand-off frame members have apex portions anchored to said outer duct.

16. The concentric duct apparatus of claim 15 wherein said apex portions are spot-welded to said outer duct.

17. The concentric duct apparatus of claim 15 wherein said apex portions have flattened configurations.

18. The concentric duct apparatus of claim 12 further comprising:

a first annular external seal pocket formed on an end portion of said tubular outer duct, a first annular resilient seal member received in said first annular external seal pocket and radially projecting into said tubular outer duct, a second annular external seal pocket formed on an end portion of said tubular inner duct, and a second annular resilient seal member received in said second annular external seal pocket and radially projecting into said tubular inner duct.

19. A method of fabricating a longitudinal section of a concentric direct vent structure for a fuel-fired appliance, said method comprising the steps of:

providing an open-ended outer duct extending along a first axis and having a stand-off apparatus anchored therein;

providing an open-ended inner duct extending along a second axis, said inner duct being laterally smaller than said outer duct and having axially spaced exterior locking structures thereon;

coaxially inserting said inner duct into said outer duct to a predetermined operative position therein; and causing said stand-off apparatus and said locking structures to cooperate, in response to coaxial insertion of said inner duct into said outer duct to said operative position, in a manner snap-fitting said inner duct into said outer duct and nonreleasably locking said inner duct against removal from said outer duct in either axial direction.

20. The method of claim 19 wherein said step of providing an open-ended outer duct is performed by providing an open-ended outer duct extending along said first axis and having axially spaced first and second stand-of members anchored therein.

21. The method of claim 20 wherein said causing step is performed in a manner utilizing said locking structures to resiliently and radially outwardly deflect portions of said stand-off apparatus during said coaxially inserting step.

22. The method of claim 21 wherein said step of providing an open-ended outer duct includes the step of providing said first and second stand-off members with polygonal, generally frame-shaped configurations in which said stand-off members having generally flat, plate-shaped side walls having opposite axially facing side edges, resiliently deflectable in directions transverse to said first axis, and are substantially undeflectable in opposite directions parallel to said first axis.

23. The method of claim 19 wherein said step of providing an open-ended inner duct includes the step of providing each of said first and second locking structures with an axially inwardly facing annular side surface extending transversely to said second axis, and an axially outwardly facing annular side surface that slopes axially inwardly and laterally outwardly.

* * * * *

UNITED STATES PATENT AND TRADEMARK OFFICE
CERTIFICATE OF CORRECTION

PATENT NO.   : 6,076,862
DATED        : June 20, 2000
INVENTOR(S)  : Barth et al.

It is certified that error appears in the above-identified patent and that said Letters Patent is hereby corrected as shown below:

Column 8,
Line 48, "resiliently" should be -- are resiliently --.

Signed and Sealed this

Eighteenth Day of September, 2001

*Attest:*

*Attesting Officer*

NICHOLAS P. GODICI
*Acting Director of the United States Patent and Trademark Office*